United States Patent
Karasawa

(10) Patent No.: US 6,333,950 B1
(45) Date of Patent: Dec. 25, 2001

(54) ENCODING APPARATUS AND METHOD AND COMPUTER READABLE RECORDING MEDIUM IN WHICH ENCODING PROGRAM HAS BEEN RECORDED

(75) Inventor: Katsumi Karasawa, Takanezawa-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/061,230

(22) Filed: Apr. 16, 1998

(30) Foreign Application Priority Data

Apr. 18, 1997 (JP) .................................................... 9-101757

(51) Int. Cl.[7] ...................................................... A04B 1/66
(52) U.S. Cl. ......................................................... 375/240.23
(58) Field of Search .................................... 348/423, 465, 348/584, 426, 432, 484, 423.1, 467, 411; 370/474, 522; 382/246; 375/240.14, 240.22, 240.23

(56) References Cited

U.S. PATENT DOCUMENTS

| | | | |
|---|---|---|---|
| 5,440,345 | * | 8/1995 | Shimoda ............................. 348/423 |
| 5,481,307 | * | 1/1996 | Goldstein et al. .................... 348/384 |
| 5,534,944 | * | 7/1996 | Egawa et al. ........................ 348/584 |
| 5,537,409 | * | 7/1996 | Moriyama et al. ................... 348/423 |
| 5,598,415 | * | 1/1997 | Nubert et al. ........................ 348/465 |
| 5,614,946 | * | 3/1997 | Fukuoka .............................. 348/423 |
| 5,784,112 | * | 7/1998 | Ogasawara et al. ................. 348/423 |

* cited by examiner

Primary Examiner—Chris Kelley
Assistant Examiner—Gims Philippe
(74) Attorney, Agent, or Firm—Fitzpatrick, Cella, Harper & Scinto

(57) ABSTRACT

In an encoding apparatus/method first information data which was variable length encoded is inputted, the first information data is variable length packetized by a plurality of data trains, second information data concerning the first information data is generated, and the variable length packetized first information data and the generated second information data are multiplexed to a plurality of packets of a fixed length. A packet length of the variable length packetized information train is detected, and a multiplexing process to the packets of the fixed length is controlled in accordance with the detection result. A computer readable recording medium contains an encoding program to execute the above processes.

23 Claims, 7 Drawing Sheets

ENCODING APPARATUS AND METHOD AND COMPUTER READABLE RECORDING MEDIUM IN WHICH ENCODING PROGRAM HAS BEEN RECORDED

BACKGROUND OF THE INVENTION

1. Field of the Invention

The present invention relates to an apparatus for variable length encoding of image data and transmission encoding in accordance with a transmission path and, more particularly, to a multiplexing process of variable length encoding data and transmission synchronous information.

2. Related Background Art

In recent years, a digital processing system according to the MPEG (Moving Picture Experts Group) 2 standard [ISO/IEC (International Organization for Standardization/International Electrotechnical Commission) 13818-1 to 13818-3] is becoming a standard of a video transmitting system.

FIG. 1 is a block diagram showing a construction on the transmitting side of a general digital transmitting apparatus according to ISO/IEC 13818-1 to 13818-3.

In FIG. 1, reference numeral 301 denotes a video encoder for compressing digital video data so as to conform with ISO/IEC 13818-2; 302 an audio encoder for compressing a digital audio signal so as to conform with ISO/IEC 13818-3; 303 a packetizer for packetizing a video elementary stream as an output of the video encoder in accordance with the PES (Packetized Elementary Stream) of ISO/IEC 13818-1; and 304 a packetizer for packetizing an audio elementary stream as an output of the audio encoder in accordance with the PES of ISO/IEC 13818-1.

Reference numeral 305 denotes a TS (Transport Stream) multiplexer for packetizing a video PES and an audio PES as outputs of the packetizers into transport stream packets in accordance with the TS (Transport Stream) of ISO/IEC 13818-1 and multiplexing them.

The transmitting operation of the digital transmitting apparatus constructed as mentioned above will now be described hereinbelow.

The video data and audio data are inputted to the video encoder 301 and audio encoder 302, respectively. In the video encoder 301, information whose correlation is high with respect to the space and time is checked and converted into data of a low redundancy in accordance with ISO/IEC 13818-2, thereby compressing an information amount.

In the audio encoder 302, information whose correlation is high with regard to the time is checked and converted into data of a low redundancy in accordance with ISO/IEC 13818-3, thereby compressing an information amount. A unit which can be solely decompressed in those compressed data trains is called an access unit (AU), data trains of the video AU and audio AU are called a video elementary stream (video ES) and an audio elementary stream (audio ES), respectively.

The video ES and audio ES are respectively inputted to the packetizers 303 and 304 and are packetized (PES) to variable length packets generally on a unit basis in which the access unit is set to a reference together with a stream ID indicative of an attribute of the ES, time stamp information showing a decoding time and a display time on the decoding side, and the like.

The TS multiplexer 305 receives the video PES and audio PES, converts into transport streams (TS), and outputs.

FIG. 2 is a block diagram showing a detailed construction of the TS multiplexer 305.

In FIG. 2, each of the video PES and audio PES is accumulated in each buffer and is packetized on a unit basis for transmitting data. This packet is called a transport stream packet (TS packet). In ISO/IEC 13818-1, the TS packet has a size of 188 bytes and includes a header including a sync byte which is necessary to reconstruct the TS packet on the decoding side, a PID (Packet Identification) showing the ID of the TS packet, and the like, an adaptation field in which annexed information which is necessary to transmit PCR (Program Clock Reference) showing a reference time to specify a receiving time on the decoding side and the like are described, and the other space area (payload) into which the video PES or audio PES is stored. On the other hand, synthetic annexed information of the TS such as definition of the PID or the like is formed as PSI (Program Specific Information), is stored into a buffer, and is packetized to a TS packet having the PID which has previously been defined.

As for the PCR, since it has to be outputted as a TS within a period of time of 100 msec, generally, the PID for PCR is defined by PSI separately from the packets to transmit the video PES and audio PES and is packetized as a TS packet constructed by only the packet header including the PID and the adaptation field.

Each TS packet is read out from each buffer at a proper timing on a TS packet unit basis and is outputted as TS.

According to the multiplexing method of data in the digital transmitting apparatus as mentioned above, there is a large limitation in an amount of data which is transmitted onto the transmitting path, the transmitting path cannot be effectively used, and a vain stuffing data always has to be multiplexed.

For example, when the video PES shown in FIG. 3 is converted into the TS packet, the adaptation field is inserted into the last TS packet and the vain stuffing byte (dummy data bytes for making a packet data length constant) have to be multiplexed.

Even in case of transmitting the independent TS packet for the transmission of PCR as shown in FIG. 4, the stuffing process is necessary in the TS packet.

SUMMARY OF THE INVENTION

In consideration of the background as mentioned above, it is an object of the invention to provide encoding apparatus and method which can solve the above-mentioned problems in a conventional data multiplexing method and can effectively use a transmission path and, further, is strong against a transmission error and to provide a recording medium in which a transmitting program has been recorded.

To accomplish the above object, according to a preferred embodiment of the invention, there is provided an encoding apparatus/method comprising the steps of: inputting first information data which was variable length encoded; variable length packetizing the first information data by a plurality of data trains; generating second information data concerning the first information data; multiplexing the first information data which was variable length packetized and the generated second information data to a plurality of packets of a fixed length; detecting the packet length of the information train which was variable length packetized; and controlling a multiplexing process to the packets of the fixed length in accordance with the detection result.

According to another preferred embodiment of the invention, there is provided an encoding apparatus/method comprising the steps of: inputting first information data which was variable length encoded; variable length packetizing the first information data by a plurality of data trains; generating second information data concerning the first information data; multiplexing the first information data which was variable length packetized and the generated second information data to a plurality of packets of a fixed length; counting an elapsed time required for the multiplexing of the second information data; detecting the packet length of the information train which was variable length packetized; and controlling a multiplexing process to the packets of the fixed length in accordance with the count result and the detection result.

According to still another preferred embodiment of the invention, there is provided a computer readable recording medium in which an encoding program has been recorded, comprising: a code of an inputting step of inputting first information data which was variable length encoded; a code of a first packetizing step of variable length packetizing the first information data by a plurality of data trains; a code of a generating step of generating second information data concerning the first information data; a code of a second packetizing step of multiplexing the first information data which was variable length packetized by the first packetizing step and the second information data generated by the generating step to a plurality of packets of a fixed length; a code of a detecting step of detecting the packet length of the information train which was variable length packetized by the first packetizing step; and a code of a control step of controlling a multiplexing process in the second packetizing step in accordance with a result of the detecting step.

According to further another preferred embodiment of the invention, there is provided a computer readable recording medium in which an encoding program has been recorded, comprising: a code of an inputting step of inputting first information data which was variable length encoded; a code of a first packetizing step of variable length packetizing the first information data by a plurality of data trains; a code of a generating step of generating second information data concerning the first information data; a code of a second packetizing step of multiplexing the first information data which was variable length packetized by the first packetizing step and the second information data generated by the generating step to a plurality of packets of a fixed length; a code of a counting step of counting an elapsed time required for the multiplexing of the second information data; a code of a detecting step of detecting the packet length of the information train which was variable length packetized by the first packetizing step; and a code of a control step of controlling a multiplexing process in the second packetizing step in accordance with results of the counting step and the detecting step.

Other objects, features and advantages of the invention will become apparent from the following detailed description taken in conjunction with the accompanying drawings.

DETAILED DESCRIPTION OF THE PREFERRED EMBODIMENTS

An embodiment will now be described with respect to a case, as an example, where video data encoded by ITU-T (International Telecommunication Union-Telecommunication Standardization Sector) Recommendation H.222.0: ISO/IEC 13818-2 is system encoded by ITU-T Recommendation H.222.0: ISO/IEC 13818-1.

Figure 1:
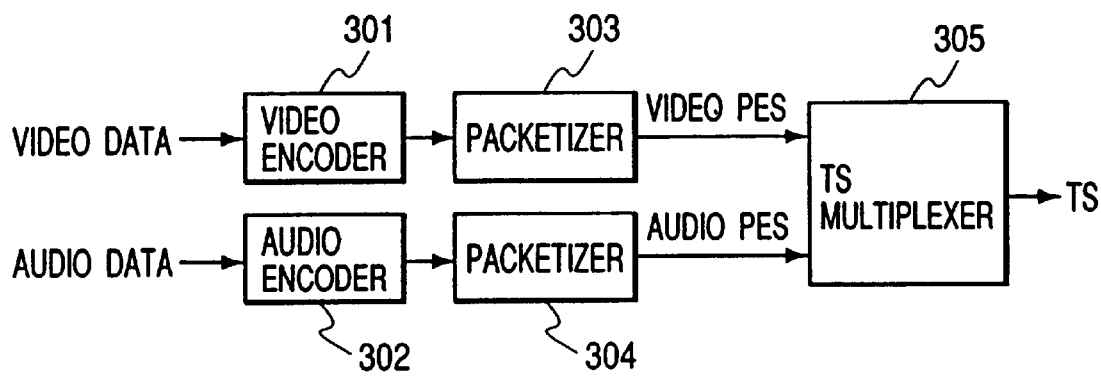
FIG. 1 is a block diagram showing a construction on the transmitting side of a general digital transmitting apparatus according to ISO/IEC 13818-1 to 13818-3.
Figure 2:
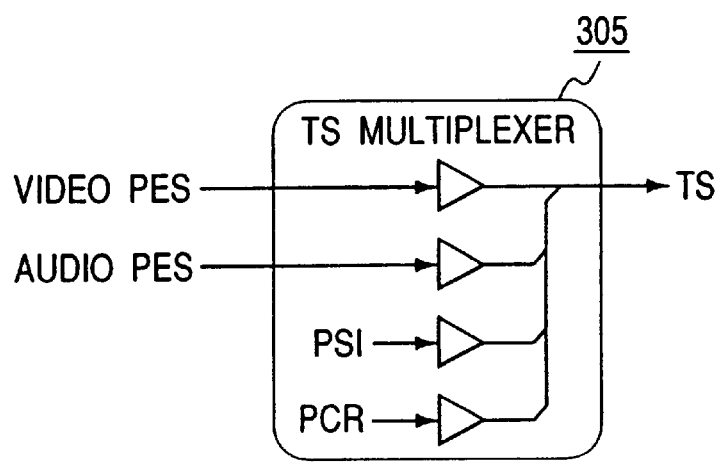
FIG. 2 is a block diagram showing a detailed construction of a TS multiplexer 305 in FIG. 1.
Figure 3:
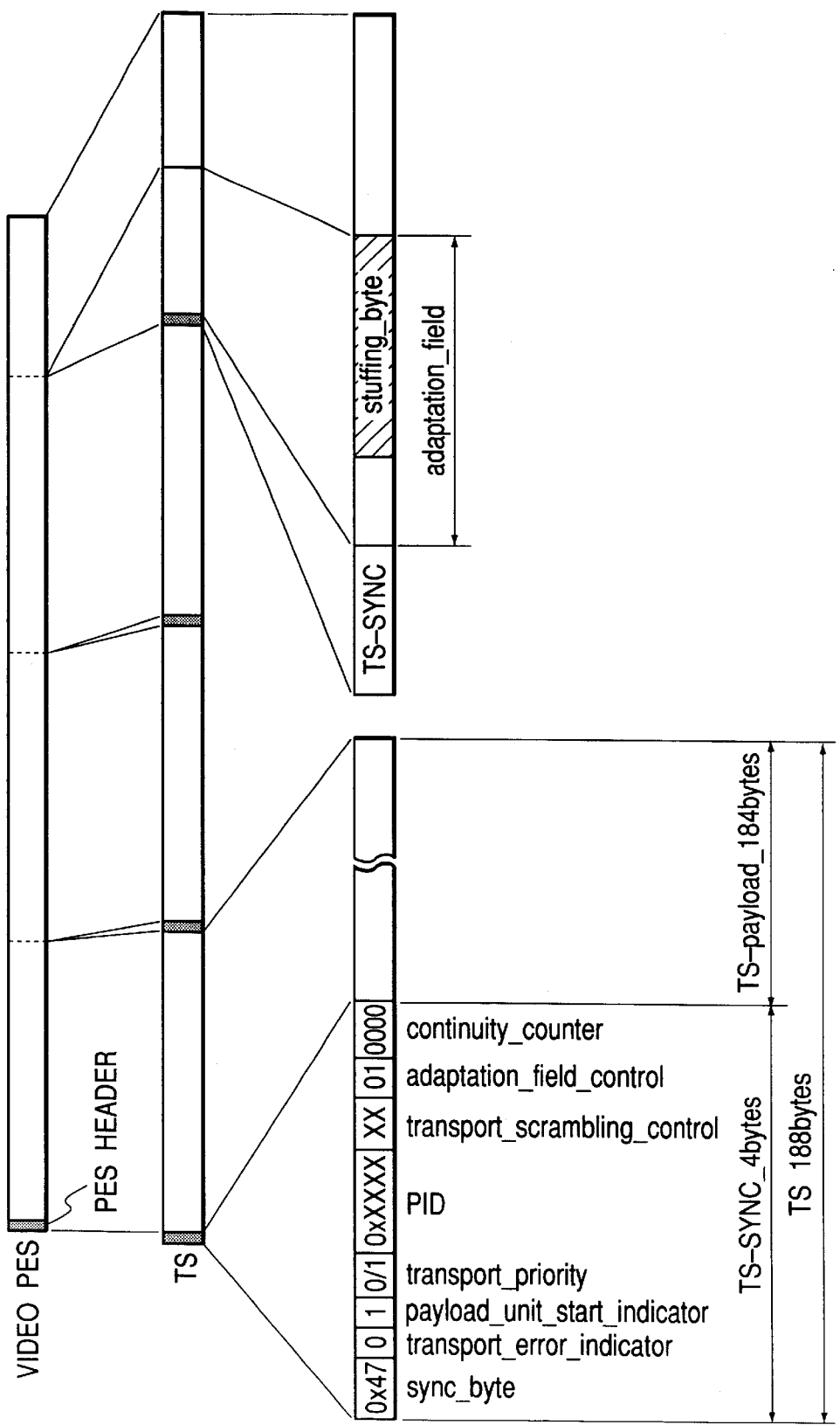
FIG. 3 is a diagram for explaining a PES/TS converting format.
Figure 4:
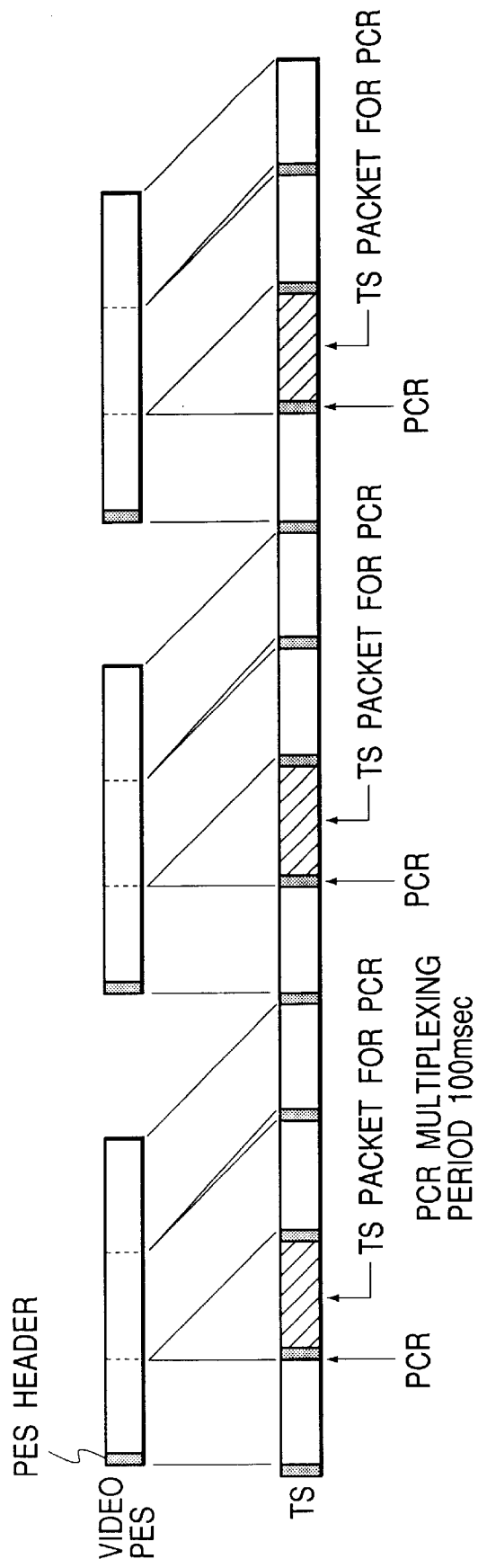
FIG. 4 is a diagram for explaining a PES/TS converting format including PCR.
Figure 5:
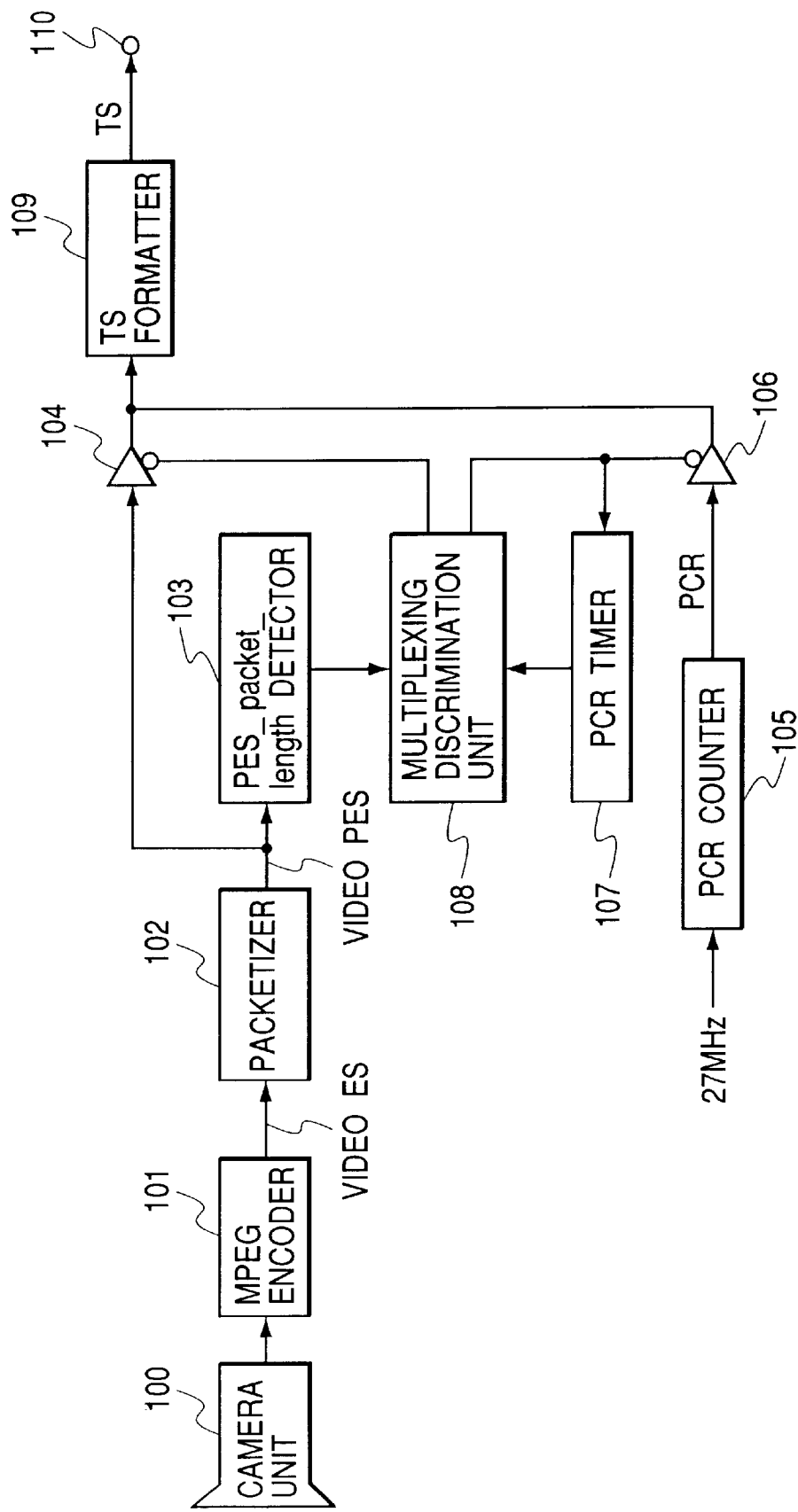
FIG. 5 is a block diagram showing a construction of an image encoding apparatus according to an embodiment of the invention.

FIG. 5 is a block diagram showing a construction of an encoding apparatus as an embodiment of the invention.

In FIG. 5, video data photographed by a camera unit 100 is encoded by an MPEG encoder 101 in accordance with ITU-T Recommendation H.222.0: ISO/IEC 13818-2.

The video data encoded by the MPEG encoder 101 is outputted to a packetizer 102 as a video elementary stream.

The inputted video elementary stream is converted to a packetized elementary stream shown by ITU-T Recommendation H.222.0: ISO/IEC 13818-1 by the packetizer 102.

An information length which is packetized is packetized every slice shown in, for example, ITU-T Recommendation H.222.0: ISO/IEC 13818-2 in consideration of a data error of a transmission path.

The packetized elementary stream of a variable length which was packetized every slice by the packetizer 102 is supplied to a packet length detector 103 and a multiplexing buffer 104.

In the packet length detector 103, PES_packet_length in the packetized elementary stream encoded by ITU-T Recommendation H.222.0: ISO/IEC 13818-1 is detected and a packetized elementary stream length [PES_packet_length+6 bytes (PES header)] is stored.

A PCR counter 105 is a counter for forming a program_clock_reference_base and program_clock_reference_extension for a system synchronization shown in ITU-T Recommendation H.222.0: ISO/IEC 13818-1. The program_clock_reference_base and program_clock reference_extension formed by the PCR counter 105 are supplied to a multiplexing buffer 106.

A PCR timer 107 is a timer for counting the numbers of periods of multiplexed program_clock_reference_base and program_clock reference_extension.

A multiplexing discrimination unit 108 receives information from the packet length detector 103 and PCR timer 107 and feeds back output controls of the multiplexing buffers 104 and 106 and a multiplexing result to the PCR timer 107.

In a TS formatter 109, output data of the multiplexing buffers 104 and 106 is converted into a transport packet shown by ITU-T Recommendation H.222.0: ISO/IEC 13818-1 and is outputted from an output terminal 110.

The details of the MPEG encoder 101 will now be described.

Figure 6:
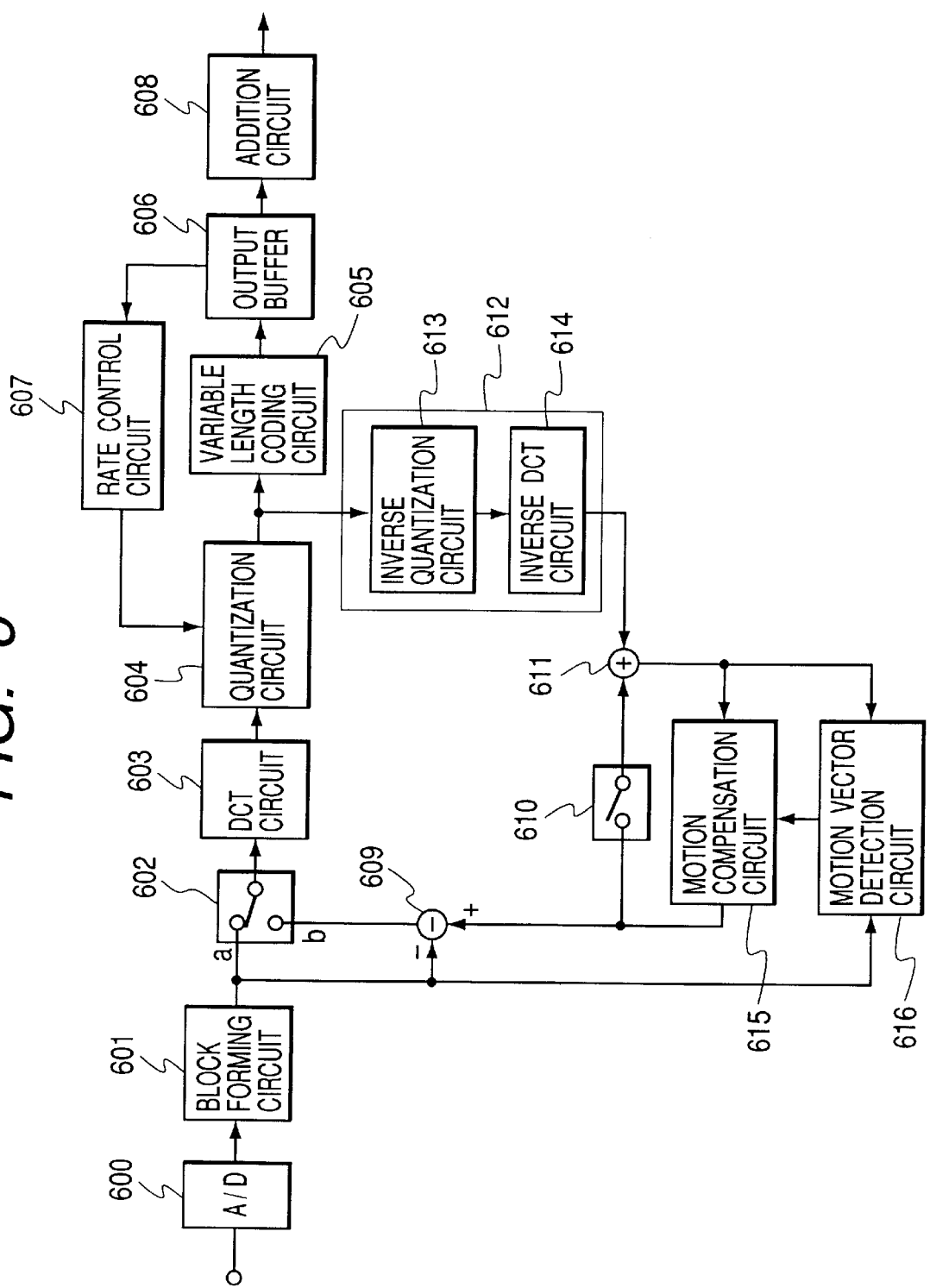
FIG. 6 is a block diagram showing a construction of an MPEG encoder 101.

FIG. 6 is a block diagram showing a construction of the MPEG encoder 101. As shown in FIG. 6, The MPEG encoder 101 is schematically constructed by a block forming circuit 601, a DCT circuit 603, a quantization (Q) circuit 604, a variable length coding (VLC) circuit 605, a motion compensation circuit 615, a motion vector detection circuit 616, a rate control circuit 607, a local decoding circuit 612, an output buffer 606, and the like.

In FIG. 6, inputted image data is converted into a digital signal by an A/D conversion circuit 600. The image data converted to the digital signal by the A/D conversion circuit 600 is divided into blocks of (8 pixels)×(8 pixels) mentioned above by the block forming circuit 601 and is transmitted to the DCT circuit 603 through a switch 602.

The switch 602 is switched in dependence on whether the input image data is an intra-frame (I frame) or the other frame [P (forward predictive encoding) frame or B (two-way predictive encoding) frame]. In case of the intra-frame, the switch 602 is connected to an (a) contact. In the other cases, it is connected to a (b) contact.

In case of the intra-frame, it is DCT transformed by the DCT circuit 603 and is converted from data of a space area to data of a frequency area. DCT coefficients obtained by such conversion are quantized by the quantization circuit 604 and are variable length encoded by the variable length coding circuit 605. After that, the encoded data is once stored into the buffer 606.

In case of the frame other than the intra-frame, the switch 602 is connected to the contact (b) and the motion compensation described above is executed. That is, reference numerals 613 and 614 denote an inverse quantization circuit and an inverse DCT circuit constructing the local decoding circuit 612. The data quantized by the quantization circuit 604 is returned to the original image by the local decoding circuit 612.

Reference numeral 611 denotes an adder, 610 a switch which is closed only in the cases except for the intra-frame, and 609 a subtractor.

As for the image data decoded by the local decoding circuit 612, a corresponding macro block in a predetermined frame (preceding frame, subsequent frame, or interpolated frame of them) is outputted with reference to a motion vector detected by the motion vector detection circuit 616.

A subtracting process is performed between an output of the motion compensation circuit 615 and the input image data by the subtractor 609, so that a difference value is obtained. The difference value is encoded by the DCT circuit 603, quantization circuit 604, and variable length coding circuit 605 and is stored into the buffer 606.

The motion vector detection circuit 616 compares frame data to be encoded from now on with predetermined reference frame data, thereby obtaining a motion vector. A detection output of the detection circuit 616 is supplied to the motion compensation circuit 615. The motion compensation circuit 615 designates a macro block to be outputted.

The rate control circuit 607 executes a code amount control by switching a quantization step in the quantization circuit 604 on the basis of an occupation amount of the encoding data in the buffer 606.

Lastly, various headers (for example, a flag to identify the I, P, and B frames) are added to the encoding data by an addition circuit 608. The resultant encoding data is transmitted as MPEG data corresponding to the MPEG system.

The operation of the multiplexing discrimination unit 108 will now be described with reference to FIGS. 7A and 7B.

Figures 7, 7A:
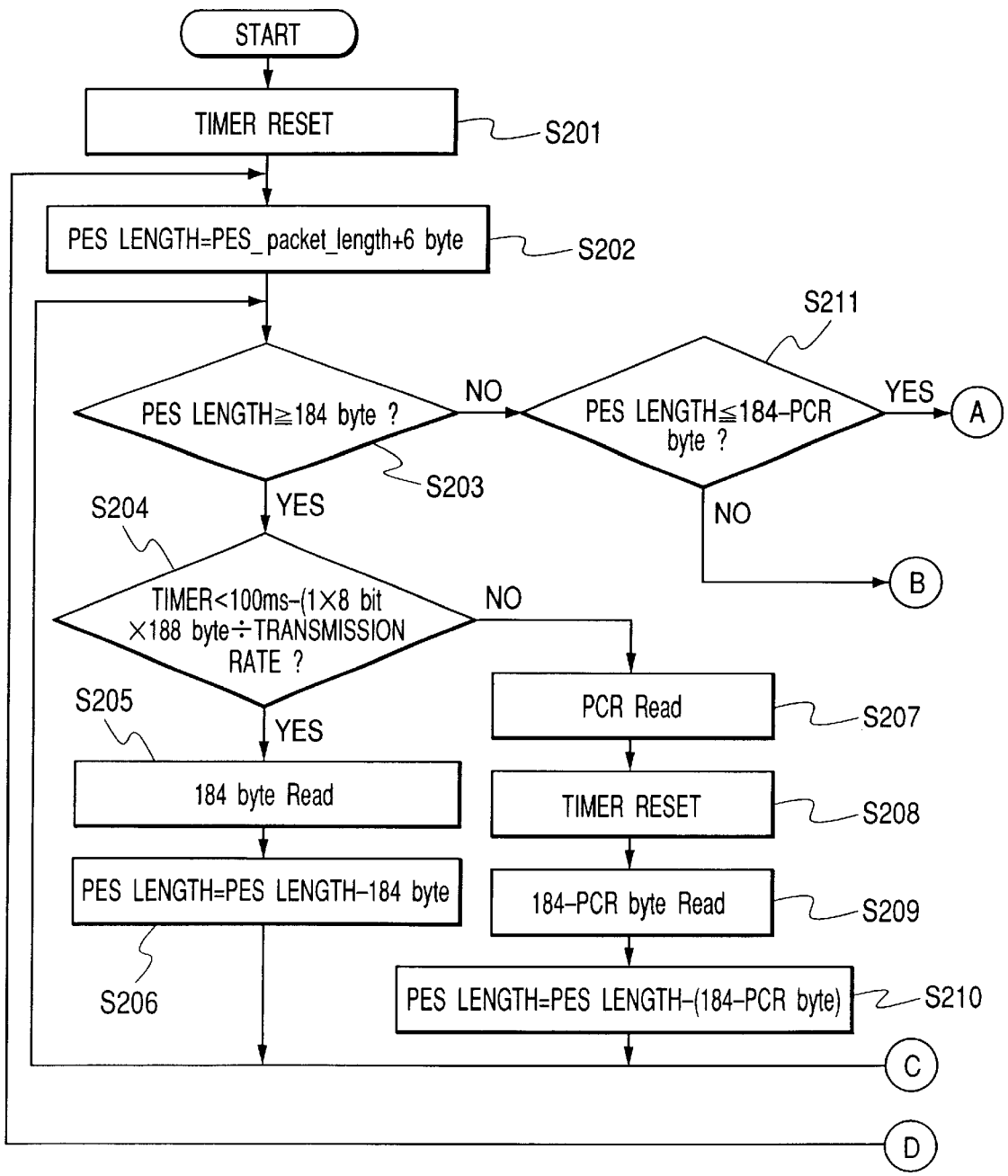
FIG. 7 which is composed of FIGS. 7A and 7B is a flowchart showing the operation of a multiplexing discrimination unit 108.
Figure 7B:
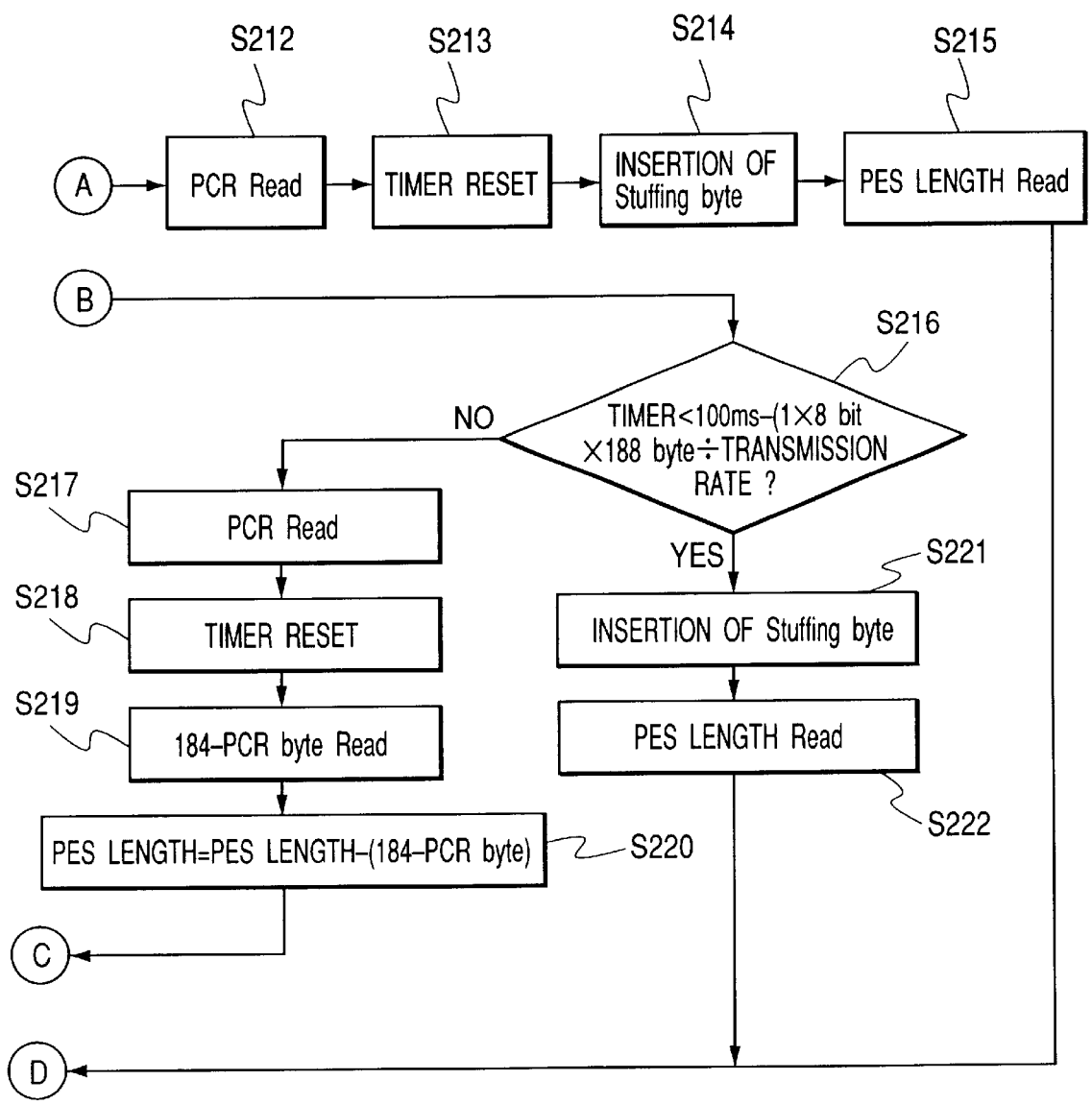

FIGS. 7A and 7B are flowcharts showing the operation of the multiplexing discrimination unit 108.

First in step S201, the PCR timer 107 is reset from the multiplexing discrimination unit 108. After resetting, the PCR timer 107 operates in a real-time manner.

In step S202, a packetized elementary stream length (PES length) is detected (the number of bytes used in the PES length is detected) by the packet length detector 103 and step S203 follows.

The PES length is obtained by detecting PES_packet length in the packetized elementary stream and adding 6 bytes which are used in the PES header to the detection result.

In step S203, a length of 184 bytes corresponding to a payload portion of the transport stream packet shown by ITU-T Recommendation H.222.0: ISO/IEC 13818-1 is compared with the detected PES length. If the length is equal to or longer than 184 bytes, step S204 follows. In the other cases, step S211 follows.

In step S204, a value of the PCR timer 107 is read. In this step, a check is made to see if it is larger than the value obtained by subtracting the time required for transmitting 188 bytes as much as one transport stream packet from 100 msec as an upper limit value of a transmitting cycle of the PCR field specified by ITU-T Recommendation H.222.0: ISO/IEC 13818-1. That is, in step S204, the above discrimination is performed to guarantee that the PCR has to be outputted as a TS within a period of time of 100 msec.

In step S204, when the value of the timer 107 does not exceed the value obtained by subtracting the time required to transmit 188 bytes of one transport stream packet from 100 msec, step S205 follows. If it exceeds 100 msec, step S207 follows.

In step S205, 184 bytes (video PES) corresponding to the payload amount of the transport stream packet are outputted from the multiplexing buffer 104.

Subsequently, step S206 follows and the number of bytes (184 bytes) outputted in step S205 is subtracted from the number of bytes of the PES length before then and the remaining PES length is detected. The processing routine is returned to step S203.

In step S207, the PCR value is outputted from the multiplexing buffer 106. After the PCR value was outputted, the PCR timer 107 is reset in step S208. Step S209 follows.

In step S209, the number of bytes obtained by excluding the number of bytes as much as the PCR field from 184 bytes of the payload amount of the transport stream packet is outputted from the multiplexing buffer 104. Step S210 follows. In step S210, the number of bytes outputted from the multiplexing buffer 104 is subtracted from the number of bytes of the PES length before then and the remaining PES length is detected. The processing routine is returned to step S203.

In step S203, when the PES length is less than 184 bytes, step S211 follows.

In step S211, a check is made to see if the PES length is equal to or less than (184−the number of bytes as much as the PCR field). When the PES length is equal to or less than (184−the number of bytes of the PCR field), step S212 follows. In the other cases, step S215 follows.

In step S212, the PCR value is outputted from the multiplexing buffer 106. In step S213, the PCR timer 107 is reset. Step S214 follows and the stuffing bytes of [184−(PES length+PCR)] bytes are inserted.

In step S215, all of the remaining video PESs are outputted from the multiplexing buffer 104. The processing routine is returned to step S202 and the next PES length is detected.

In step S216, the value of the PCR timer 107 is read. In this case, a check is made to see if it exceeds the value obtained by subtracting the time required for transmitting 188 bytes as much as one transport stream packet from 100 msec as an upper limit value of the transmitting cycle of the PCR field specified by the ITU-T Recommendation H.222.0: ISO/IEC 13818-1. If it does not exceed, step S220 follows. If it exceeds, step S217 follows.

In step S217, the PCR value is outputted from the multiplexing buffer 106. After the PCR value was outputted, the PCR timer 107 is reset in step S218. In step S219, the number of bytes obtained by excluding the number of bytes as much as the PCR field from 184 bytes as much as the payload amount of the transport stream packet is outputted from the multiplexing buffer 104. Step S220 follows. In step S220, the number of bytes outputted from the multiplexing buffer 104 is subtracted from the number of bytes of the PES length before then and the remaining PES length is detected. The processing routine is returned to step S203.

In step S221, stuffing bytes of the number obtained by subtracting the number of bytes of the present PES length from 184 bytes are inserted. In step S222, the remaining video PES is outputted from the multiplexing buffer 104. The processing routine is returned to step S202 and the processing routine advances to the process of the next packetized elementary stream.

By executing each of the foregoing steps, when each of the variable length video packetized elementary streams is multiplexed to the transport stream packet of the fixed length, the PCR is not inserted into the transport stream packet for the video image every predetermined period but when a fraction which can insert the PCR occurs in the video data, even if the present cycle does not reach a specified inserting cycle, the PCR is inserted and the stuffing bytes which go to waste upon multiplexing are deleted.

According to the embodiment as described above, since transmission synchronous information is multiplexed in accordance with a generation amount of the encoding data of the variable length, an amount of vain information which is transmitted onto the transmission path can be minimized.

There is an advantage such that the multiplexing period of the transmission synchronous information is also variable and the apparatus is also strong against a transmission error. Further, its effect further increases with an increase in number of multiplexing programs.

The invention can be applied to a system constructed by a plurality of equipment (for example, host computer, interface equipment, reader, printer, etc.) or can be also applied to an apparatus comprising one equipment (for example, copying apparatus, facsimile apparatus).

There is also incorporated an embodiment such that in order to make various devices operative so as to realize the functions of the foregoing embodiment, program codes of software to realize the functions of the embodiment are supplied to a computer in an apparatus or system connected to the above various devices and the programs stored in the computer (CPU or MPU) of the system or apparatus are read out therefrom and the various devices are made operative in accordance with the read-out programs.

In this case, the program codes themselves of the software realize the functions of the embodiment. The program codes themselves and means for supplying the program codes to the computer, for example, a storing medium in which such program codes have been stored construct the invention.

As such a storing medium to store the program codes, for example, it is possible to use any one of a floppy disk, a hard disk, an optical disk, a magnetooptic disk, a CD-ROM, a CD-R, a magnetic tape, a non-volatile memory card, an ROM, or the like.

It will be obviously understood that the program codes are included in the embodiment of the invention in not only a case where the functions of the foregoing embodiment are realized by executing the supplied program codes by the computer but also a case where the functions of the embodiment are realized in cooperation with the OS (Operating System) by which the program codes operate in the computer or another application software or the like.

Further, it will be also obviously understood that the invention also incorporates a case where after the supplied program codes were stored in a memory provided for a function extended board of the computer or a function extended unit connected to the computer, a CPU or the like provided for the function extended board or function storing unit executes a part or all of the actual processes on the basis of an instruction of the program codes and the functions of the foregoing embodiment are realized by the processes.

In other words, the foregoing description of embodiments has been given for illustrative purposes only and not to be construed as imposing any limitation in every respect.

The scope of the invention is, therefore, to be determined solely by the following claims and not limited by the text of the specifications and alternations made within a scope equivalent to the scope of the claims fall within the true spirit and scope of the invention.

What is claimed is:

1. An encoding apparatus comprising:
   a) input means for inputting first information data which was variable length encoded;
   b) first packetizing means for variable length packetizing said first information data;
   c) generating means for generating second information data concerning said first information data;
   d) second packetizing means for multiplexing said first information data which was variable length packetized by said first packetizing means and said second information data generated by said generating means to a plurality of packets of a fixed length;
   e) counting means for counting an elapsed time required for the multiplexing of said second information data;
   f) detecting means for detecting a packet length of an information train which was variable length packetized by said first packetizing means; and
   g) control means for controlling a multiplexing processing of said second packetizing means to select adaptively the packet of fixed length according to an output of said counting means and an output of said detecting means and multiplex said second information data and the selected packet of fixed length.

2. An apparatus according to claim 1, wherein said second information data is transmission sync information.

3. An apparatus according to claim 1, wherein when a count value of said counting means exceeds a predetermined value, said control means controls so as to preferentially multiplex said second information data.

4. An apparatus according to claim 1, wherein, in the case where the first packet data which was variable length packetized by said first packetizing means is multiplexed to said packets of fixed length, when said first packet data is less than a predetermined amount of data, said second information data is multiplexed to said same packets of the fixed length as said first packet data.

5. An apparatus according to claim 1, wherein said first information data is image data and said image data has been encoded according to the MPEG system.

6. An apparatus according to claim 5, wherein said input means includes image pickup means for photographing an object image.

7. An apparatus according to claim 1, wherein said control means multiplexes dummy data for stuffing in accordance with an output of said detecting means.

8. An apparatus according to claim 7, wherein said control means multiplexes dummy data for stuffing in accordance with an output of said counting means.

9. An encoding apparatus comprising:
   a) input means for inputting first information data which was variable length encoded;
   b) first packetizing means for variable length packetizing said first information data;
   c) generating means for generating second information data concerning said first information data;
   d) second packetizing means for multiplexing said first information data which was variable length packetized by said first packetizing means and said second information data generated by said generating means to a plurality of packets of a fixed length;
   e) detecting means for detecting a packet length of an information train which was variable length packetized by said first packetizing means; and
   f) control means for controlling, in accordance with an output of said detecting means, whether or not said second information data is to be multiplexed to each of the packets of fixed length,
   wherein said control means controls a multiplexing processing of said second packetizing means so as to select adaptively the packet of fixed length according to the output of said detecting means and multiplex said second information data and the selected packet of fixed length.

10. An apparatus according to claim 9, wherein said second information data is transmission sync information.

11. An apparatus according to claim 10, wherein said first information data is image data and said image data has been encoded according to the MPEG system.

12. An apparatus according to claim 11, wherein said input means includes image pickup means for photographing an object image.

13. An apparatus according to claim 12, wherein said control means multiplexes dummy data for stuffing in accordance with an output of said detecting means.

14. An encoding method comprising:
   a) an input step of inputting first information data which was variable length encoded;
   b) a first packetizing step of variable length packetizing said first information data;
   c) a generating step of generating second information data concerning said first information data;
   d) a second packetizing step of multiplexing said first information data which was variable length packetized in said first packetizing step and said second information data generated in said generating step to a plurality of packets of a fixed length;
   e) a counting step of counting an elapsed time required for the multiplexing of said second information data;
   f) a detecting step of detecting a packet length of an information train which was variable length packetized in said first packetizing step; and
   g) a control step of controlling multiplexing processing in said second packetizing step to select adaptively the packet of fixed length according to a result of said counting step and a result of said detecting step and multiplex said second information data and the selected packet of fixed length.

15. An encoding method comprising:
   a) an input step of inputting first information data which was variable length encoded;
   b) a first packetizing step of variable length packetizing said first information data;
   c) a generating step of generating second information data concerning said first information data;
   d) a second packetizing step of multiplexing said first information data which was variable length packetized in said first packetizing step and said second information data generated in said generating step to a plurality of packets of a fixed length;
   e) a detecting step of detecting a packet length of an information train which was variable length packetized in said first packetizing step; and
   f) a control step of controlling, in accordance with a result of said detecting step, whether or not said second information data is to be multiplexed to each of the packets of a fixed length,
   wherein said control step includes a step of controlling a multiplexing processing in said second packetizing step so as to select adaptively the packet of fixed length according to the result of said detecting step and multiplex said second information data and the selected packet of fixed length.

16. A computer readable recording medium in which an encoding program has been recorded, wherein said encoding program has:
   a) a code of an input step of inputting first information data which was variable length encoded;
   b) a code of a first packetizing step of variable length packetizing said first information data;
   c) a code of a generating step of generating second information data concerning said first information data;
   d) a code of a second packetizing step of multiplexing said first information data which was variable length packetized in said first packetizing step and said second information data generated by said generating step to a plurality of packets of a fixed length;
   e) a code of a counting step of counting an elapsed time required for the multiplexing of said second information data;
   f) a code of a detecting step of detecting a packet length of an information train which was variable length packetized in said first packetizing step; and
   g) a code of a control step of controlling the multiplexing process in said second packetizing step to select adaptively the packet of fixed length according to a result of said counting step and a result of said detecting step and multiplex said second information data and the selected packet of fixed length.

17. A computer readable recording medium in which an encoding program has been recorded, wherein said encoding program has:
   a) a code of an input step of inputting first information data which was variable length encoded;
   b) a code of a first packetizing step of variable length packetizing said first information data by a plurality of data trains;
   c) a code of a generating step of generating second information data concerning said first information data;
   d) a code of a second packetizing step of multiplexing said first information data which was variable length packetized in said first packetizing step and said second information data generated in said generating step to a plurality of packets of a fixed length;
   e) a code of a detecting step of detecting a packet length of an information train which was variable length packetized by said first packetizing step; and f) a code of a control step of controlling a timing of the multiplexing process of said second information data in said second packetizing step in accordance with a result of said detecting step, whether or not the second information is to be multiplexed to each of the packets of fixed length, wherein said control step includes a step of controlling a multiplexing processing in said second packetizing step so as to select adaptively the packet of fixed length according to the result of said detecting step and multiplex said second information data and the selected packet of fixed length.

18. An apparatus according to claim 5, wherein said second information data is a program clock reference.

19. An apparatus according to claim 11, wherein said second information data is a program clock reference.

20. A method according to claim 14, wherein said first information data is image data and the image data has been encoded according to an MPEG system, and said second information data is a program clock reference.

21. A method according to claim 15, wherein said first information data is image data and the image data has been encoded according to an MPEG system, and said second information data is a program clock reference.

22. A computer readable recording medium according to claim 16, wherein said first information data is image data and the image data has been encoded according to an MPEG system, and the second information data is a program clock reference.

23. A computer readable recording medium according to claim 17, wherein said first information data is image data and the image data has been encoded according to an MPEG system, and said second information data is a program clock reference.

* * * * *

UNITED STATES PATENT AND TRADEMARK OFFICE
CERTIFICATE OF CORRECTION

PATENT NO.    : 6,333,950 B1
DATED         : December 25, 2001
INVENTOR(S)   : Katsumi Karasawa et al.

It is certified that error appears in the above-identified patent and that said Letters Patent is hereby corrected as shown below:

<u>Title page,</u>
Item [75], Inventor, "Takanezawa-machi" should read -- Tochigi-ken --.

<u>Column 4,</u>
Line 61, "The" should read -- the --.

<u>Column 7,</u>
Line 40, "can be also" should read -- also can be --.

<u>Column 8,</u>
Line 4, "will be also" should read -- also will be --.

Signed and Sealed this

Second Day of July, 2002

Attest:

JAMES E. ROGAN
*Attesting Officer*   *Director of the United States Patent and Trademark Office*